(12) United States Patent
Motozono et al.

(10) Patent No.: US 6,638,652 B1
(45) Date of Patent: Oct. 28, 2003

(54) FUEL CELL CONTROL APPARATUS

(75) Inventors: Yoshikazu Motozono, Aichi-ken (JP); Masashi Yamashita, Aichi-ken (JP); Masaaki Yamaoka, Toyota (JP); Kiyomi Nagamiya, Toyota (JP); Iwao Maeda, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/392,262

(22) Filed: Sep. 9, 1999

(30) Foreign Application Priority Data

Oct. 2, 1998 (JP) .......................... 10-281666
Feb. 1, 1999 (JP) .......................... 11-023829

(51) Int. Cl.[7] ........................... H01M 8/04; H01M 8/06
(52) U.S. Cl. ........................ 429/19; 429/22
(58) Field of Search ........................ 429/13, 17, 19, 429/22–25

(56) References Cited

U.S. PATENT DOCUMENTS

| | | | | |
|---|---|---|---|---|
| 4,046,956 A | * | 9/1977 | Fanciullo ............... | 429/20 |
| 4,839,246 A | * | 6/1989 | Takabayashi ........... | 429/12 |
| 4,883,724 A | * | 11/1989 | Yamamoto ............. | 429/23 |
| 5,009,967 A | * | 4/1991 | Scheffler | |
| 5,141,824 A | * | 8/1992 | Hirota | |
| 5,366,821 A | * | 11/1994 | Merritt et al. | |
| 5,624,768 A | * | 4/1997 | Tanokura | |
| 5,945,229 A | * | 8/1999 | Meltser | |
| 6,063,516 A | * | 5/2000 | Grot et al. ............. | 429/12 |

FOREIGN PATENT DOCUMENTS

| | | |
|---|---|---|
| JP | 59-111271 | 6/1984 |
| JP | 59-111272 | 6/1984 |
| JP | 60-37673 | 2/1985 |
| JP | 60-216467 | 10/1985 |
| JP | 4-58463 | * 2/1992 |
| JP | 9-315801 | 12/1997 |

OTHER PUBLICATIONS

Blomen and Mugerwa ("Fuel Cell Systems", Plentum Press: New York (1993) pp. 238, 239, 322, 323, 363 and Figure 8.33)*
Broesch (Digital Signal Processing Demystified, LLH Technology Publishing: California (1997), pp. 3, 9–11, and 62–65).*
Horowitz and Hill ("The Art of Electronics", Cambridge University Press: New York (1989), p 987).*

* cited by examiner

Primary Examiner—Susy Tsang-Foster
(74) Attorney, Agent, or Firm—Oblon, Spivak, McClelland, Maier & Neustadt, P.C.

(57) ABSTRACT

A fuel cell control apparatus for controlling the supply amount of oxidizing gas to a fuel cell for producing electric energy by reaction between fuel gas and oxidizing gas includes a smoother for smoothing the output related quantity of the fuel cell, and an oxidizing gas feed determining device for determining the supply amount of the oxidizing gas on the basis of the output related quantity smoothed by the smoother, and therefore when controlling the amounts of the fuel gas and oxidizing gas depending on the output demand of the fuel cell, the substantial power generation efficiency is enhanced and the output is stabilized at the same time.

1 Claim, 9 Drawing Sheets

FUEL CELL CONTROL APPARATUS

INCORPORATION BY REFERENCE

The disclosures of Japanese Patent Application Nos. HEI 10-281666 filed on Oct. 2, 1998 and HEI 11-23829 filed on Feb. 1, 1999 including the specification, drawings and abstract are incorporated herein by reference in their entirety.

BACKGROUND OF THE INVENTION

1. Field of the Invention

The present invention relates to a control apparatus for fuel cell for obtaining electric power by an electrochemical reaction between fuel gas obtained by a reforming reaction of a reformate fuel, and an oxidizing gas, and more particularly to an apparatus for controlling the supply amount of reformate fuel or supply amount of oxidizing gas. This invention also relates to a method of controlling a fuel cell using the apparatus.

2. Description of the Related Art

A fuel cell is a kind of energy transformer for inducing an electrochemical reaction between a fuel gas such as hydrogen gas and an oxidizing gas such as oxygen gas in air, through an electrolyte, and picking up the generated electromotive force to the outside. Depending on the variety of electrolyte, polyelectrolyte fuel cell, phosphate fuel cell, solid electrolyte fuel cell and others are known, and in particular the polyelectrolyte fuel cell has many advantages such as low reaction temperature, and is highly expected to be used as a driving source for vehicles.

The power generation efficiency of these fuel cells varies with the temperature or humidity of the electrolyte, and the output increases depending on the supply amount of the fuel gas and oxidizing gas, and therefore in order to produce a required electric quantity efficiently, it is important to control the running conditions and the supply gas amounts. Relating to the oxidizing gas, for example, the oxidizing gas and fuel gas react with each other according to their composition, and if the oxidizing gas is supplied in excess of the fuel gas, the output of the fuel cell is not increased. On the contrary, however, the power required to supply the oxidizing gas may lower the power generation efficiency of the entire system, or the excessive oxidizing gas may cool the electrolyte to lower the power generation efficiency. It is hence needed to supply the oxidizing gas into the fuel cell depending on the required output.

For example, in the invention disclosed in JP No. 60-216467, by making use of the discharge pressure-discharge air flow curve of the compressor for feeding air to the fuel cell, and the voltage-current density curve of single cell (single battery), the air flow to be supplied into the cathode electrode in partial load operation of the fuel cell is calculated, and the control valve provided at the discharge side of the air compressor is controlled so as to be adjusted to the calculated air flow. That is, when the output current density is lowered, the discharge amount of the air compressor is lowered, and the discharge pressure is raised at the same time, and therefore the single cell voltage is raised and the power generation efficiency is enhanced.

In this related apparatus, along with changes of the required output in the fuel cell, the supply air flow and its pressure are varied, but the air supply state in the cathode electrode of the fuel cell and the air discharge state from the air compressor do not always coincide with each other. That is, when supplying air into the cathode electrode in the fuel cell from a supply device such as air compressor (air pump), an inevitable control delay occurs due to external factors such as flow resistance in a path of air supply, or expansion or contraction due to temperature changes. Besides, the fuel gas supplied into the fuel cell may not always coincide exactly with the required output of the fuel cell. Accordingly, if the output of the fuel cell changes and it is desired to change the supply amount of air or oxidizing gas accordingly, the supply amount of the oxidizing gas does not change by following the output of the fuel cell, and excess and insufficient supply amount of oxidizing gas occur alternately, and the output of the fuel cell may be unstable. Or, by supplying the oxidizing gas excessively, more power is consumed than necessary, which may lower the power generation efficiency of the entire system.

SUMMARY OF THE INVENTION

The invention is devised in the light of the drawbacks discussed above, it is hence an object of the invention to provide a control apparatus capable of enhancing the substantial power generation efficiency of a fuel cell, and stabilizing the output of the fuel cell easily.

To achieve the object, a first aspect of the invention relates to a fuel cell control apparatus which includes a fuel cell for producing electric energy, a physical quantity controller for controlling a physical quantity based on an output quantity in order to control the output quantity of the electric energy, a smoother for smoothing the output related quantity relating to the output of the fuel cell, and a physical quantity determining device for determining the physical quantity on the basis of the smoothed output related quantity.

In the first aspect of the invention, the quantity relating to the output such as output demand amount of fuel cell is smoothed by the smoother. This is, for example, a process of accumulating the output related quantities for a specific time, and determining the average, or a process of setting the intermediate value of the deviation of the present value and the target value after change for a specific time when the output related quantity is changed. Accordingly, since the physical quantity for determining the output quantity of the electric energy produced from the fuel cell is changed by following the smoothed output related quantity, neither shortage nor excess of supply amount of physical quantity occurs.

Preferably, the physical quantity determining device determines the amount of oxidizing gas reacting with the fuel gas to be supplied in the fuel cell, as the physical quantity. As a result, the output related quantity of the fuel cell, as the decisive factor of the supply amount of the oxidizing gas, is smoothed, and the output related quantity does not include temporary increase or decrease, and variation of the supply amount of oxidizing gas is suppressed, so that the output of the fuel cell is thereby stabilized.

In addition, the first aspect of the invention may further include a reformer for generating the fuel gas to be supplied to the fuel cell by a reforming reaction of reformate fuel, and the physical quantity determining device may control the amount of reformate fuel to be supplied to the reformer as the physical quantity. As a result, sudden change of command value of reformate fuel supplied to the reformer is suppressed, and irregular variations of control are prevented.

In addition, the first aspect of the invention may also include a adjuster for adjusting the reformate fuel amount determined by the reformate fuel determining device, according to the relation between the value obtained by the smoother and the output related quantity at a given moment.

As a result, for example, if the deviation between the output related quantity at a given moment and the smoothed value of the output related quantity is large, the reformate fuel amount to be supplied to the reformer is adjusted. More specifically, the quantity determined by the reformate fuel determining means is adjusted by increasing or adjusted by decreasing. Accordingly, as compared with the reformate fuel amount determined only on the basis of the smoothed value, the reformate fuel amount is increased or decreased, and hence the response of the reformer is improved.

A second aspect of the invention relates to a fuel cell control apparatus which includes a fuel cell mounted on a vehicle as a driving power source, for producing electric energy generated by reaction between fuel gas and oxidizing gas, an acceleration or deceleration degree detector for detecting the manipulation amount relating to the acceleration or deceleration by the driver of the vehicle, and an oxidizing gas feed determining device for determining the supply amount of oxidizing gas to the fuel cell, on the basis of the manipulation amount detected by the acceleration or deceleration degree detector.

According to the second aspect, when the driver accelerates or decelerates the vehicle, the supply amount of the oxidizing gas to the fuel cell is increased or decreased accordingly, so that the output of the fuel cell suited to the driver's request for acceleration or deceleration may be obtained.

In addition, the second aspect of the invention may further include an oxidizing gas adjuster for adjusting the supply amount of the oxidizing gas on the basis of the reforming response which is the generated state of the fuel gas, relative to the reformate fuel supplied in the reformer. As a result, when determining the supply amount of the oxidizing gas on the basis of the amount of the reformate fuel supplied in the reformer, the supply amount of the oxidizing gas, which should correspond to the a mount of fuel gas supplied in the fuel cell, is determined in consideration of the response when the reformate fuel i s reform ed into fuel gas, and therefore the supply amount of the oxidizing gas corresponds more accurately to the supply amount of the fuel gas, and an excess or a shortage of supply amount of oxidizing gas is avoided. The output of the fuel cell is, thus, stabilized.

A third aspect of the invention relates to a fuel cell control apparatus which comprises a fuel cell for producing electric energy generated by reaction between fuel gas and oxidizing gas, a reformer for generating a fuel gas to be supplied into the fuel cell by reforming reaction of reformate fuel, a reformate fuel detector for detecting the amount of reformate fuel to be supplied into the reformer, and an oxidizing gas feed determining device for determining the supply amount of oxidizing gas to the fuel cell on the basis of the amount of reformate fuel to be supplied to the reformer.

According to the third aspect, since the amount of fuel gas generated by reforming reaction in the reformer corresponds to the amount of reformate fuel supplied in the reformer, by determining the supply amount of the oxidizing gas on the basis of the amount of the reformate fuel, the amount of oxidizing gas corresponding to the fuel gas is obtained.

The fuel cell control apparatus of the first to third aspects of the invention may also include an oxidizing gas feed adjuster for adjusting the supply amount of oxidizing gas to the fuel cell on the basis of the utility rate of the oxidizing gas in the fuel cell. According to this constitution, the whole amount of the oxidizing gas supplied into the fuel cell is not spent for reaction, but partially used for reaction with fuel gas, and therefore the supply amount of the oxidizing gas is adjusted according to its utility rate, so that the supply amount of the oxidizing gas may be further optimized.

Preferably, the fuel cell has an electrode to which an oxidizing gas is supplied, and it may further include a temperature related quantity detector for detecting the physical quantity relating to the temperature at the electrode, and an oxidizing gas feed adjuster for adjusting the supply amount of the oxidizing gas on the basis of the physical quantity relating to the temperature near the electrode detected by the temperature related quantity detector. Therefore, since the supply amount of the oxidizing gas is adjusted according to the physical quantity relating to the temperature at the electrode for inducing a substantial reaction of oxidizing gas and fuel gas, error of supply amount due to expansion or contraction of oxidizing gas is corrected, so that the supply amount of the oxidizing gas may be more accurately controlled.

The fuel cell may further include a pump for supplying an oxidizing gas, a pressure related quantity detector for detecting the physical quantity relating to the pressure near the electrode, and an oxidizing gas command adjuster for adjusting the command value to the pump on the basis of the physical quantity relating to the pressure near the electrode detected by the pressure related quantity detector. Therefore, since the supply amount of the oxidizing gas is adjusted according to the physical quantity relating to the pressure near the electrode for inducing a substantial reaction of oxidizing gas and fuel gas, that is, at the supply point of oxidizing gas, error of supply amount due to expansion or contraction of oxidizing gas is adjusted, so that the supply amount of the oxidizing gas may be more accurately controlled.

DETAILED DESCRIPTION OF THE PREFERRED EMBODIMENTS

Figure 6:
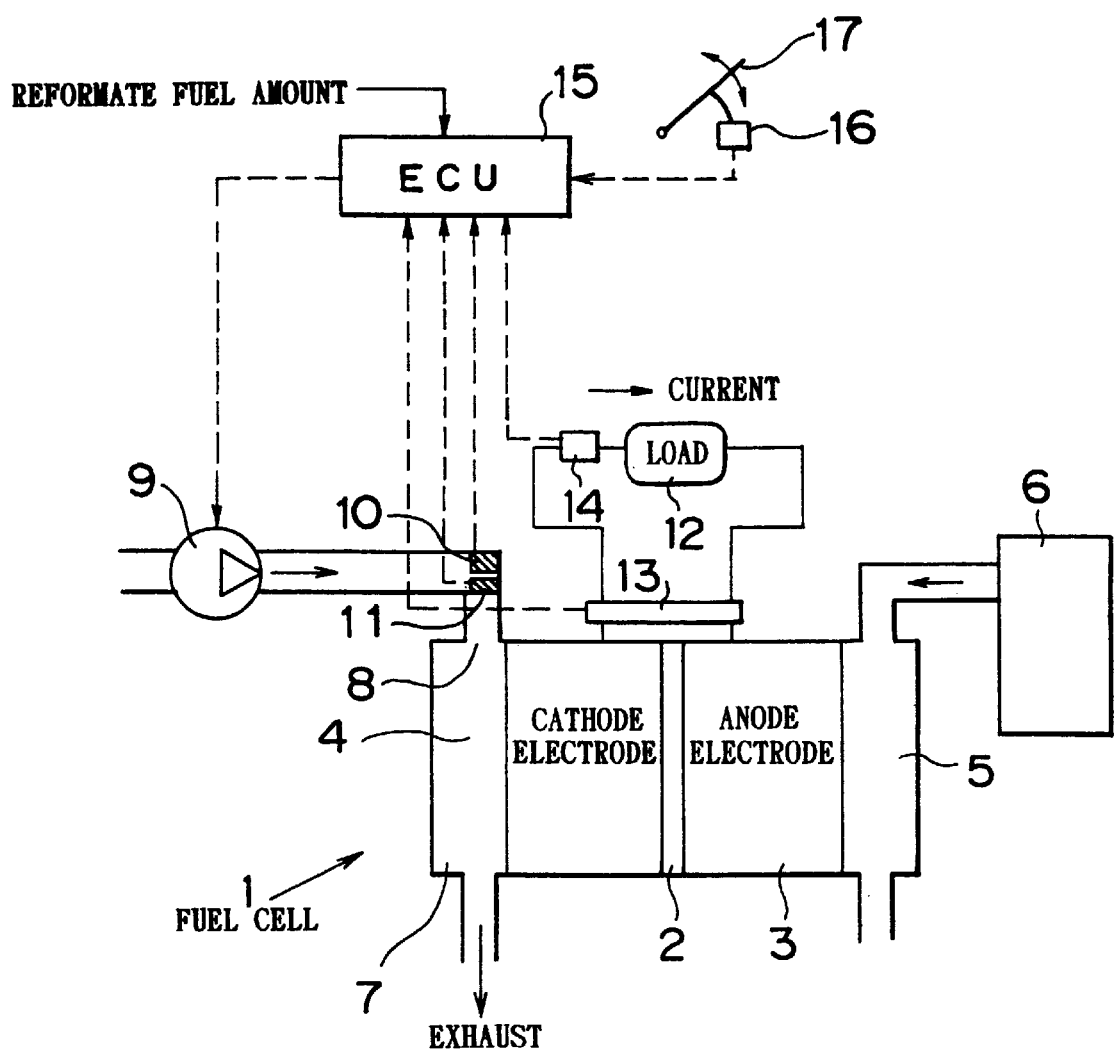
FIG. 6 is a block diagram schematically showing an entire constitution of fuel cell and its control system.

Referring now to the drawings, specific examples of a first embodiment of the invention are described below. FIG. 6 schematically shows a fuel cell 1 of the invention, in which an anode (negative electrode, fuel electrode) 3 and a cathode (positive electrode, air electrode) 4 are disposed at both sides of a solid electrolyte 2. The solid electrolyte 2 is composed of an ion permeable substance, for example, a proton permeable high polymer membrane. The anode 3 and the cathode 4 are composed by adhering a current collector to a porous layer composed of water repellent particles and catalyst particles.

At the anode 3 side, a fuel gas passage 5 is formed, and a reformer 6 is connected to this fuel gas passage 5. The reformer 6 is a device for generating a hydrogen-rich reformate gas by reforming reaction of hydrocarbon such as methanol, and therefore in the example shown in FIG. 6, reformate gas is used as fuel gas. At the cathode 4 side, an oxidizing gas passage 7 is formed, and an air pump 9 for supplying air as oxidizing gas is connected to its flow inlet 8. Near the flow inlet 8, a pressure sensor 10 and a temperature sensor 11 are provided and are configured to detect the pressure of the air supplied into the cathode 4 and the temperature near the cathode 4, respectively.

This fuel cell 1 is used as a driving source for a vehicle, and hence a running motor is connected to the anode 3 and the cathode 4 as an external load 12. In the midst of its circuit, a voltage sensor 13 and a current sensor 14 are provided.

To control the air pump 9, an electronic control unit (ECU) 15 is provided. Electronic control unit 15 is mainly composed of a microcomputer, and it receives detection signals from the sensors 10, 11, 13, 14, and also a signal indicating the reformate fuel amount to be supplied in the reformer 6, as input data. Moreover, an accelerator opening degree sensor 16 is provided for detecting the acceleration or deceleration manipulation stroke in the vehicle which includes the fuel cell 1. The depression amount of an accelerator pedal 17 detected by the accelerator opening degree sensor 16, or in other words, the "accelerator opening degree," is inputted into the electronic control unit 15.

In this fuel cell 1, like the generally employed polymer electrolyte fuel cell, the fuel gas (specifically, hydrogen gas) supplied in the anode 3 side is ionized to release electrons, hydrogen ions (protons) pass through the solid electrode 2 to reach the cathode 4 side, and electrons are received at this cathode 4 side, and therefore reaction occurs between the fuel gas and oxygen in the air. Electrons occurring in the process of this reaction are supplied into the external load 12 and used as electric power, and this electric power is determined by the amount of reaction between the fuel gas and oxidizing gas. Therefore, the amounts of fuel gas and oxidizing gas supplied into the fuel cell 1 are basically determined according to the required output in the fuel cell 1.

Figure 1:
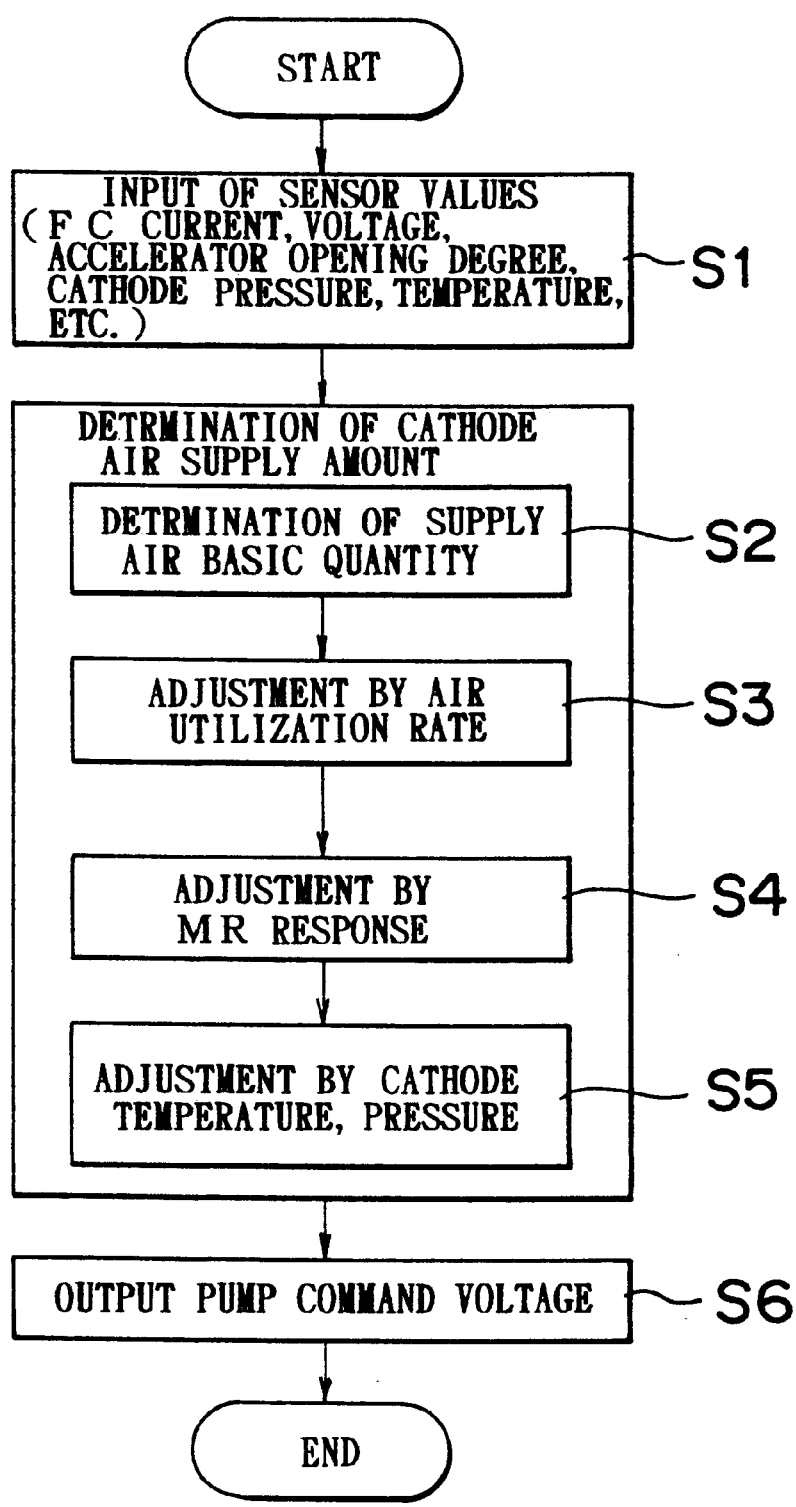
FIG. 1 is a flowchart explaining a control example executed in a control apparatus in a first embodiment of the present invention.

Control of the supply amount of oxidizing gas is specifically described below. FIG. 1 is a flowchart explaining the control procedure, in which signals are supplied from the sensors in the first step S1. Herein, the input signals include, for example, the output current of the fuel cell 1 detected by the current sensor 14, output voltage of the fuel cell 1 detected by the voltage sensor 13, accelerator opening degree detected by the accelerator opening degree sensor 16, pressure at the input of the cathode 4 detected by the pressure sensor 10, temperature near the cathode 4 detected by the temperature sensor 11, and amount of reformate fuel supplied into the reformer 6.

Figure 2:
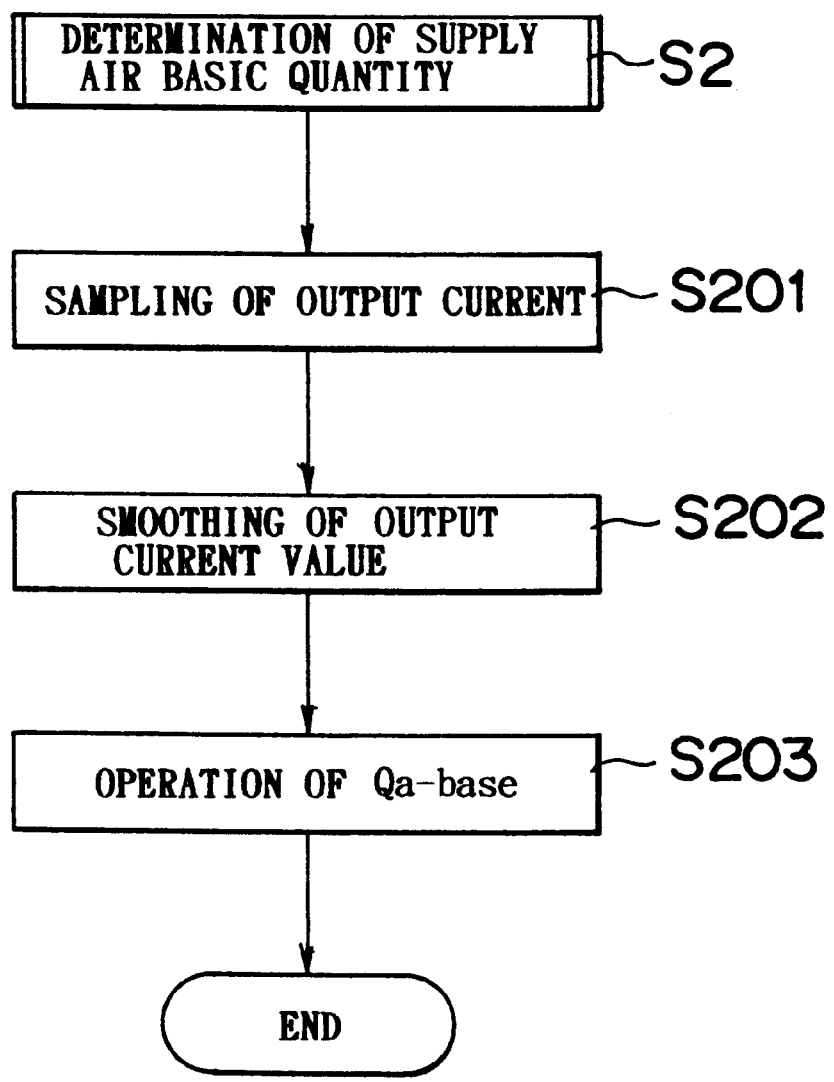
FIG. 2 is a flowchart showing an example of the sub-routine for calculating the supply air basic amount.

Consequently, on the basis of such input data, the supply amount of air as oxidizing gas to be supplied to the cathode 4 is calculated. More specifically, the basic quantity of air to be supplied Qa-base is calculated (step S2). FIG. 2 shows a sub-routine for this calculation, in which the output current, which is a kind of output related quantity of the fuel cell 1, is sampled several times (step S201), i.e., timewise, and sample values (Ifc(t), Ifc(t-Dt), . . . ) are smoothed by a smoothing filter or the like (step S202). The smoothed current value Ifc-ave may be expressed as follows:

$$Ifc\text{-}ave = f(Ifc(t), Ifc(t-\Delta t), Ifc(t-2\Delta t), \ldots)$$

in terms of the function of the smoothing filter as f.

The supply air basic quantity Qa-base is calculated as follows by using the smoothed output current Ifc-ave (step S203):

$$Qa\text{-}base = Ifc\text{-}ave / Cf / 4 / Ro2 \; V0 \; 60$$

where Cf is Faraday's constant, Ro2 is the ratio of oxygen to the air (about 1/5), and V0 is the volume of the ideal gas in standard state (22.4 liters/mol).

Therefore, if the output current of the fuel cell 1 changes suddenly, its amount of change is smoothed and the smoothed amount reflects on the supply air amount. Therefore, sudden changes or large fluctuations of the supply air amount are suppressed, so that the output current or output voltage of the fuel cell 1 may be stabilized.

Figure 3:
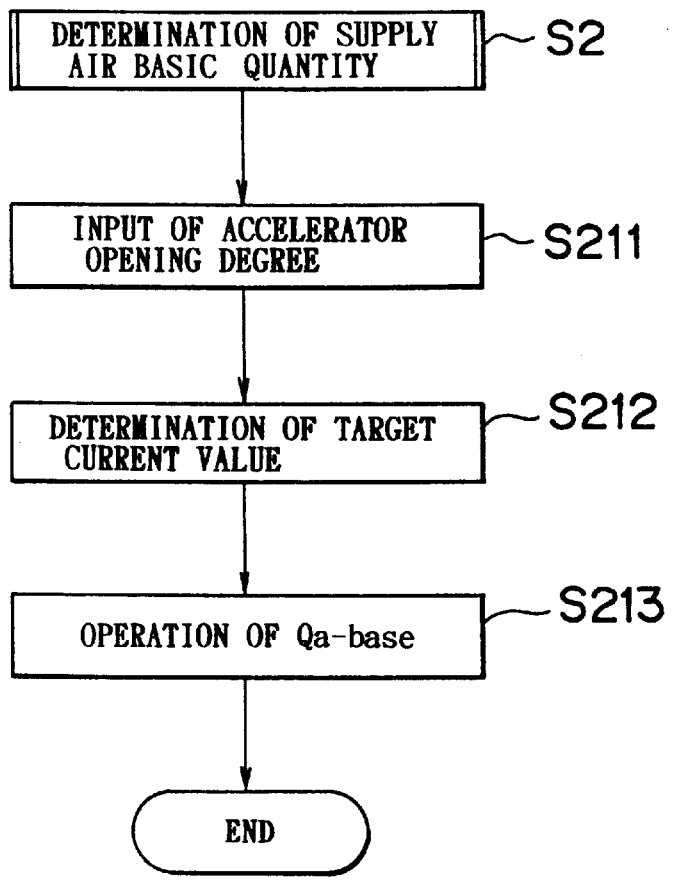
FIG. 3 is a flowchart showing the other example of the sub-routine for calculating the supply air basic amount.
Figure 4:
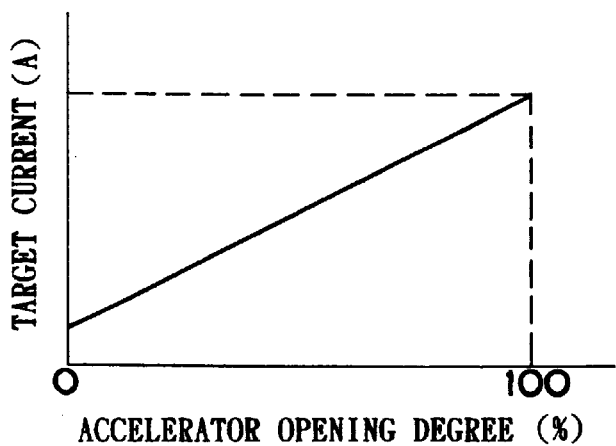
FIG. 4 is a diagram showing an example of the map for determining the relation between the accelerator opening degree and the target current value.

Another calculating procedure of supply air basic quantity is shown in FIG. 3. In this example, the supply air basic quantity is calculated on the basis of the physical quantity relating to the driver's operation amount of acceleration or deceleration, and the accelerator opening degree is inputted as the physical quantity (step S211). In succession, from the accelerator opening degree, the target current value is determined by using a map (step S212). This map is prepared by experiment or the like, of which example is given in FIG. 4. The thus obtained target current value corresponds to the smoothed output current value as shown above, and therefore by using the target current value obtained from the map as shown in FIG. 4, the supply air basic quantity Qa-base is calculated in the above formula (step S213).

When the supply air basic quantity is thus calculated, the driver's intent of acceleration or deceleration reflects on the supply air amount, and a corresponding output of the fuel cell 1 is obtained. That is, the output reflected by the driver's intent can be obtained.

Figure 5:
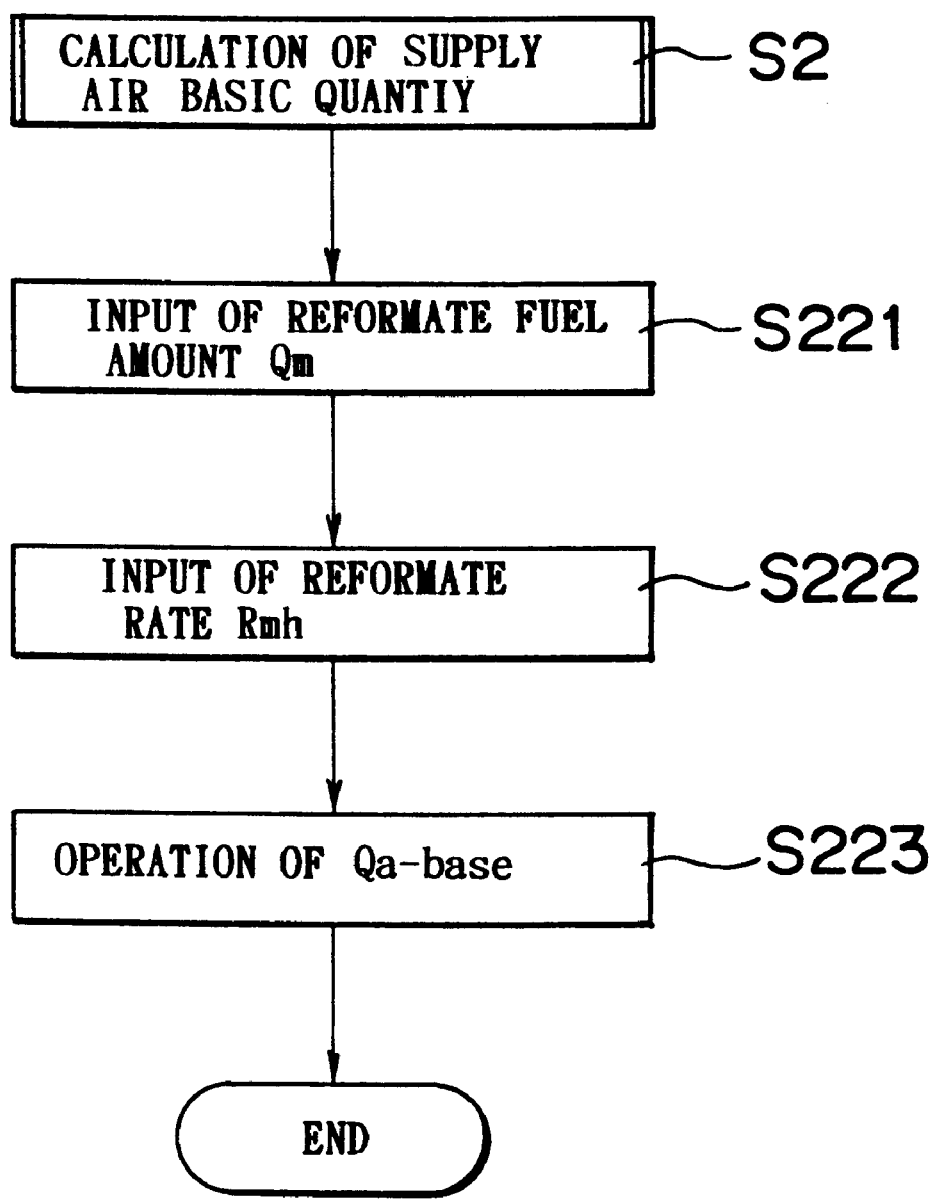
FIG. 5 is a flowchart showing a different example of sub-routine for calculating the supply air basic amount.

The oxygen in the air supplied in the cathode 4 is for reacting with the fuel gas, and its basic quantity can be determined according to the amount of the fuel gas, and since the fuel gas is generated by the reformer 6, its amount may be determined according to the amount of the reformate fuel supplied from the reformer 6. The example shown in FIG. 5 is an example of determining the supply air basic quantity Qa-base by making use of such relation. First, the reformate fuel amount Qm obtained by the control system of the reformer 6 is inputted (step S221), or the reforming rate Rmh in the reformer 6 is inputted (step S222). This reforming rate Rmh is a value preliminarily determined by experiment or the like.

Then, on the basis of such data, the supply air basic quantity Qa-base is calculated (S223). Specifically, it is calculated as follows:

$$Qa\text{-}base = Qm \; Rmh \; \tfrac{1}{2} V0 \; 60.$$

Therefore, when the supply air basic quantity is calculated as shown in FIG. 5, the amount of air corresponding to the amount of fuel gas generated according to the reformate fuel can be supplied, so that the supply air amount can be optimized.

In the fuel cell 1, incidentally, all amounts of supplied oxidizing gas and fuel gas do not react completely, but the rate of reaction is determined at a specific value depending on the constitution of the anode 3 and the cathode 4 or operating state of the fuel cell 1. Generally, the utility rate of the oxidizing gas is determined almost exclusively by the constitution of the fuel cell 1, and it can be predicted, and therefore by using this utility rate, the supply air amount is corrected (step S3). That is, the basic quantity Qa-base is multiplied by a reciprocal of the utility rate Ra, and the supply air amount Qa1 is obtained.

$$Qa1 = Qa\text{-base}/Ra$$

On the other hand, supply of air into the cathode 4 must be synchronized with supply of fuel gas into the anode 3, and therefore the supply air amount is corrected by the response in the reformer (MR) 6 (step S4). That is, after output of command for supply of reformate fuel (reformate methanol) to the reformer 6, there is a flow delay in the fuel until the commanded amount of reformate fuel is actually supplied into the reformer 6, and there is a reaction delay until the reformate fuel supplied in the reformer 6 is transformed into fuel gas (reformats gas) by the reforming reaction. Accordingly, for example, the flow delay is corrected as $$Qa1(k) = Qa1\ (k-\tau)$$

in consideration of the specified time delay t, and the reaction delay is corrected for primary delay as $$Qa2(k) = Qa1(k-\tau)1/(Ts+1)$$

where $\tau$ is the specified delay time, T is the time constant, and s is the operator.

Further, air changes in volume by expanding or contracting depending on temperature and pressure, and therefore it must be connected according to temperature and pressure (step S5). That is, to correct in accordance with the temperature, the supply air amount is corrected by the operation of $$Qa3(k) = Qa2(k)\ T\text{means}/T0$$

where Tmeans is the temperature near the cathode 4 detected by the temperature sensor 11, and T0 is the standard temperature (0° C.).

To conform to the thus obtained supply air amount Qa3(k), the command voltage Vqa3(k) to the air pump 9 is determined. It can be determined from the relation between the voltage and displacement preliminarily measured in each air pump.

Additionally, if the inlet pressure is high compared with the cathode 4, the substantial air supply amount to the cathode 4 is suppressed. Meanwhile, if the inlet pressure is relatively low, the air supply amount increases, and hence it has to be corrected according to the pressure. That is, the voltage is corrected according to the pressure in the following formula:

$$Vqa4(k) = Vqa3(k)\ (P\text{means}^{(k-1)/k} - 1)/(P0^{(k-1)/k}1)$$

where Pmeans is the pressure detected by the pressure sensor 10, P0 is the pressure obtained preliminarily when measuring the flow rate characteristic of the pump, and k is specific heat ratio ($\approx$1.4).

Since the correction in step S5 is expressed by a function in terms of temperature or pressure as the parameter, the correction value may be determined preliminarily as a map, and the correction value may be calculated according to the map. The thus calculated pump command voltage Vqa4 is issued (step S6).

This example refers to the fuel cell used in a vehicle, but the invention is not limited to this example alone (the invention may also be applied to the control apparatus for a stationary fuel cell). In the invention, moreover, the oxidizing gas may be gas other than air, and the fuel gas may be the gas other than hydrogen-rich reformate gas.

Figure 11:
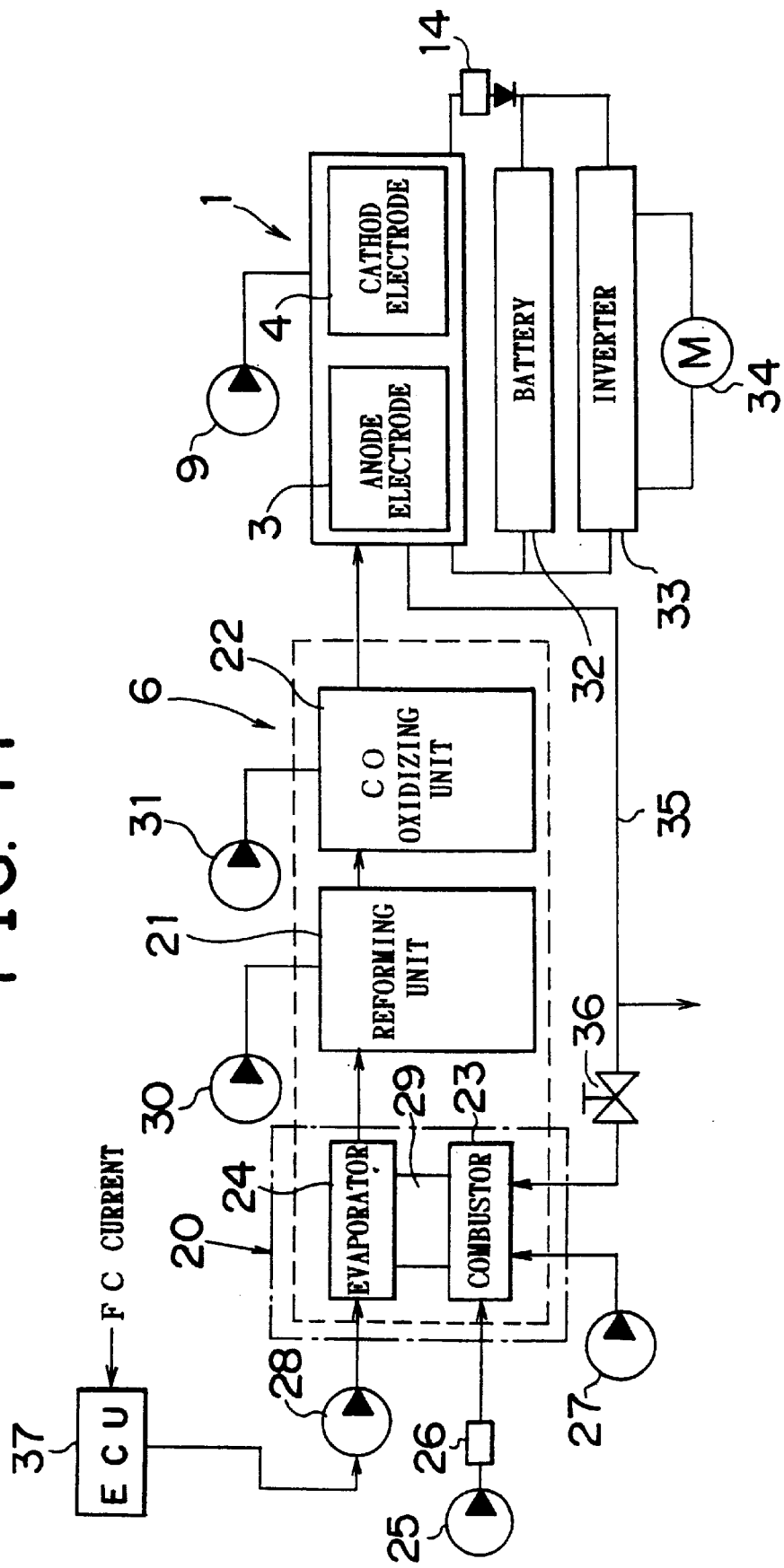
FIG. 11 is a diagram schematically showing an entire constitution of a system having a reformer connected to a fuel cell.

A second embodiment of the invention is described below. First is described a general constitution of an example of incorporating a reformer in the system for generating electric power by a fuel cell which is an example of energy transformer. As shown in FIG. 11, at the anode 3 side of the fuel cell 1, a reformer 6 is connected. The reformer 6 is designed to reform a mixture of methanol as reformate fuel and water into hydrogen and carbon dioxide, and is composed of a heater 20 for heating the reformate fuel, a reforming unit 21, and a CO oxidizing unit 22.

The heater 20 heats methanol as reformate fuel and water, and produces a mixed vapor, and is composed of a combustor 23 for generating heat for heating and an evaporator 24 for evaporating the reformate fuel by its heat. The combustor 23 may have a structure of burning the fuel for heating (heating fuel) by a burner, or a structure of oxidizing the heating fuel by catalyst. Therefore, to this combustor 24, a pump 25 for feeding methanol, which is an example of heating fuel, is connected through an injector 26, and an air feeder 27 is provided for feeding air, which is an example of oxidizing agent. The air feeder 27 is specifically composed of an air pump.

To the evaporator 24, a pump 28 is connected as a reformate fuel feeder for feeding the mixture of methanol and water. The evaporator 24 and the combustor 23 are coupled through a heat exchanger 29 so as to transmit heat to each other.

The reformer 6 generates hydrogen-rich gas mainly by reforming reaction of methanol and water. More specifically, using a copper compound catalyst of which active temperature is about 280 C, by the reforming reaction of

  (1)

a reformate gas mainly composed of hydrogen is generated. The reforming unit 21 generates hydrogen gas and heat by partial oxidation reaction of methanol, and air is supplied from an air feeder 30. That is, the reforming reaction expressed in formula (1) is an endothermic reaction, and, by contrast, the reaction of formula (2) which is a partial oxidation reaction of methanol is an exothermic reaction, and by balancing the endothermic quantity and exothermic quantity, the temperature of the reforming unit 21 may be maintained almost constantly.

  (2).

The reforming reaction shown in formula (1) and partial oxidation reaction shown in formula (2) are reactions in ideal state, and since carbon dioxide is reversibly changed into carbon dioxide, actually, carbon monoxide gas mixes into the reformate gas inevitably. This carbon monoxide causes poisoning of catalyst of the anode in the fuel cell 1, and the CO oxidizing unit 22 is provided to eliminate this. This CO oxidizing unit 22 comprises a CO oxidizing catalyst (not shown) and an air feeder 31, and by passing the reformate gas generated in the reforming unit 21, carbon dioxide contained in the reformate gas is oxidized by the oxygen in the air.

On the other hand, the fuel cell 1 comprises, the same as in the first embodiment, an electrolyte made of proton-permeable high polymer film, and an anode 3 and a cathode 4 disposed on both sides of the electrolyte film, and multiple single cells having such constitution are connected in series and parallel. The anode 3 and the cathode 4 are composed of a diffusion layer and a reaction layer individually, and the reaction layer of the anode 3 has a porous structure having a catalyst such as platinum, its alloy or ruthenium supported on copper. The reformer 6 is inserted in the anode 3, and reformate gas mainly composed of hydrogen gas is supplied therein. An air pump 9 is connected to the cathode 4, and oxygen for reacting with hydrogen in the reformate gas is thereby supplied.

To the anode 3 and the cathode 4, a battery 32 and an inverter 33 are connected as external loads so as to compose a closed circuit. A current sensor 14 is connected to the closed circuit. To the inverter 33, for example, a motor 34 is connected as an external load. The motor 34 is an operating source, for example, for driving a vehicle.

Ionization of hydrogen generated in the anode 3 and oxidation reaction through the electrolyte film do not occur in all hydrogen gas supplied in the fuel cell 1, but the reaction efficiency is tens of percent, therefore the exhaust gas from the anode 3 side contains unreacted flammable gas. To utilize it effectively, a return pipe 35 for returning the exhaust gas of the anode 3 side to the combustor 23 is disposed in a state of penetrating through the fuel cell 1 and combustor 23. In the middle part of the return pipe 35, a flow rate regulating valve 36 is installed for controlling the flow rate of the gas flowing inside. The flow rate regulating valve 36 controls its opening degree electrically. The return pipe 35 may also discharge the exhaust gas flowing inside properly to outside without supplying into the combustor 23.

An electronic control unit (ECU) 37 is provided in order to control the reformate fuel supply amount by the pump 28. This electronic control unit 37 determines the reformate fuel amount by calculating according to the output current (FC current) of the fuel cell 1 detected by the current sensor 14, stored data, and program, and issues a command signal to the pump 28 so as to supply the determined amount of reformate fuel. Therefore, this output current (FC current) corresponds to the output related quantity in the present invention.

Figure 7:
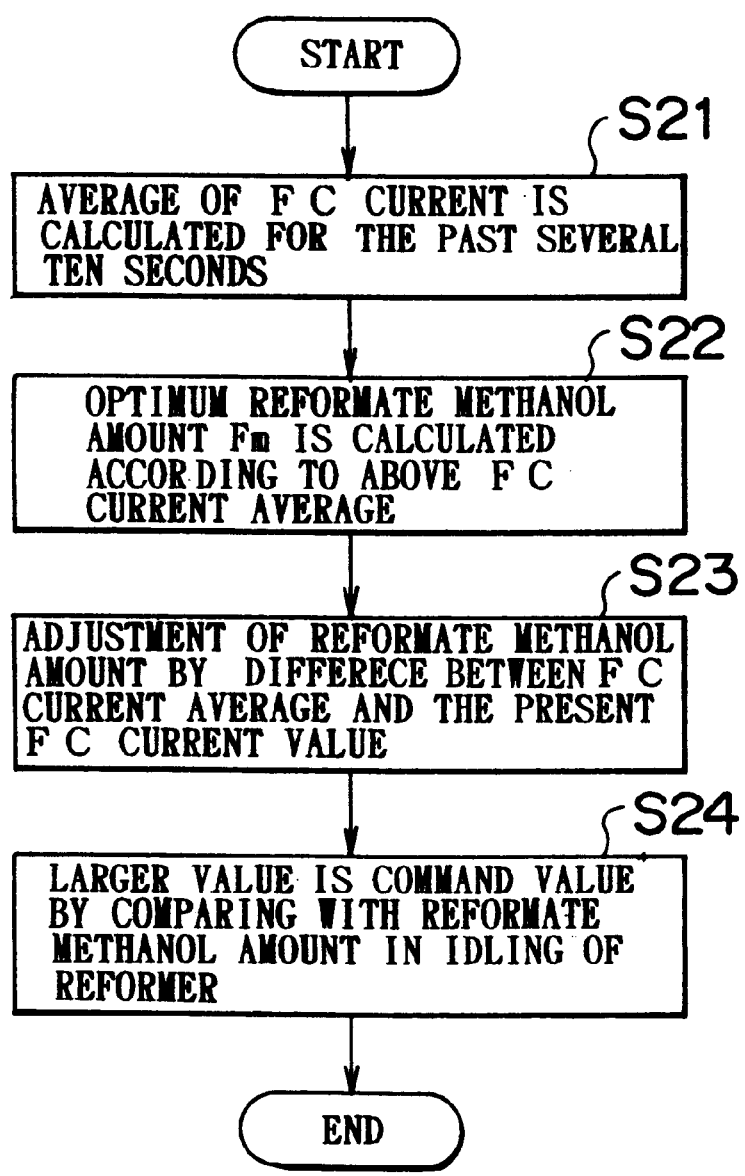
FIG. 7 is a flowchart explaining a control example executed in a control apparatus in a second embodiment of the present invention.

Explained next is an example of control by the control apparatus of the invention relating to the reformer 6 described above. FIG. 7 is a flowchart explaining this control example, in which, in the first place, the output related quantity in the fuel cell 1 as the energy transformer is smoothed (step S 21). The output related quantity is, for example, the output current (FC current) of the fuel cell, and the smoothing process is an operation process of moving average for determining the average of sampled values, over time, of the FC current, and FIG. 7 shows an example of determining the average Ifcv of output currents over tens of seconds before a given moment.

Consequently, on the basis of the value (specifically, the average of output currents) Ifcv obtained in step 21, an optimum reformate fuel amount (reformate methanol amount) Fm is calculated (step 22). The reformer 6 constituted as shown in FIG. 11 generates hydrogen gas by steam reforming reaction and partial oxidation reforming reaction of methanol, thus causing the reactions expressed in the formulas below.

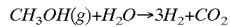

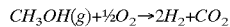

Supposing that the rates of steam reforming reaction and partial oxidation reforming reaction to be α, β (=1−α), respectively, and the reforming rate to be γ, the reformate hydrogen amount obtained from 1 mole of reformate fuel (reformate methanol) is (3α+2β)g.

In the fuel cell 1, on the other hand, hydrogen is decomposed into ions as shown in the formula below, and electrons flow along conductors.

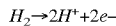

However, all of reformate hydrogen is not transformed into current, and supposing that the rate of the reactive reformate hydrogen amount in the total reformate hydrogen to be reformate hydrogen utility rate z, the current obtained from 1 mole of reformate hydrogen is $$2(3α+2β)γζF[C/S] \ ([C/S]\text{-}[A])$$

where F is Faraday's constant [C/mol]. Therefore, the reformate methanol amount Fm [mol/s] is obtained as

Figure 8:
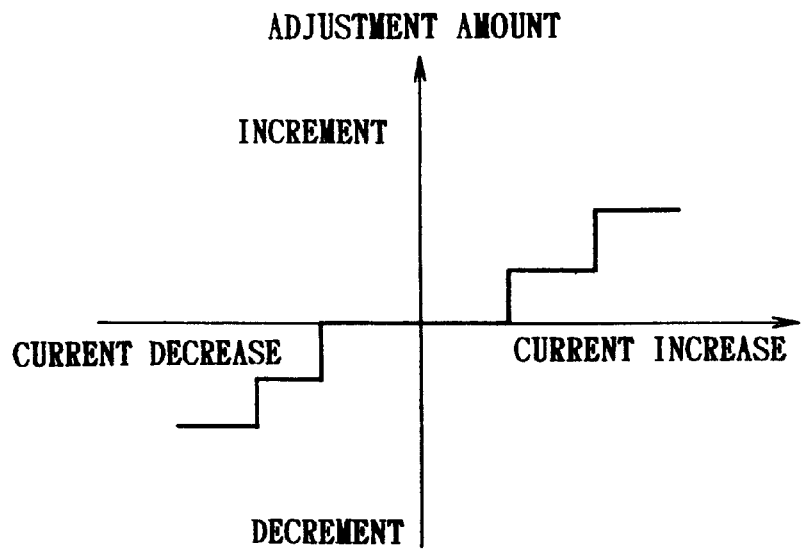
FIG. 8 is a diagram showing an example of correction map of reformate methanol amount.

Since the reformate methanol amount Fm determined in step 22 is based on the smoothed value of the output current value, if the output current changes largely in steps (that is, discontinuously), the reformate methanol amount Fm may become relatively small or, to the contrary, excessive. To avoid this, in step 23, the reformate fuel amount is corrected. That is, the deviation Δ between the present output current If and the smoothed current It obtained in step 21 is determined, and on the basis of this current deviation ΔI and the preliminarily stored correction map, the correction amount of the reformate methanol amount is determined. FIG. 8 shows an example of such correction map, in which when the current deviation ΔI is positive, the reformate methanol amount is increased, and if negative, to the contrary, it is corrected by decreasing.

In the reformer 6 shown in FIG. 11, as mentioned above, when the active temperature of the catalyst in the reforming unit 21 is relatively high, e.g., about 280 C, the heat for maintaining this temperature is fed from the heat of the reformate fuel and the heat generated by partial oxidation reaction, and therefore, in order to maintain the catalyst at the active temperature, it is necessary to keep supplying the reformate fuel by at least equal to or more than the specified minimum amount. Accordingly, in step 24, the reformate methanol amount at the time of idling of the reformer 6, that is, the lower limit value of the reformate fuel, and the reformate methanol amount Fm determined through step 23 are compared, and the larger value is selected and issued as reformate methanol command value. Therefore, if the reformate gas demanded in the fuel cell 1 is slight, the reformate fuel more than the predetermined lower limit is supplied into the reforming unit 21 as mentioned above, so that the temperature of the reformate catalyst is maintained above the active temperature or predetermined specific temperature.

Thus, according to such control, since the reformate fuel amount is determined on the basis of the smoothed value of the current, instead of the output current of the fuel cell 1, the command value of the reformate methanol amount to be supplied to the reformer 6 is not changed suddenly, and temperature changes in the evaporator 24 are suppressed, so that a homogeneous and excellent reformate gas is obtained. Besides, as explained in step 22, when determining the reformate methanol amount on the basis of the smoothed value of the output current, since the reforming rate and hydrogen utility rate are taken into consideration, it is possible to operate at high efficiency with less generation of unreacted hydrogen gas.

Figure 9:
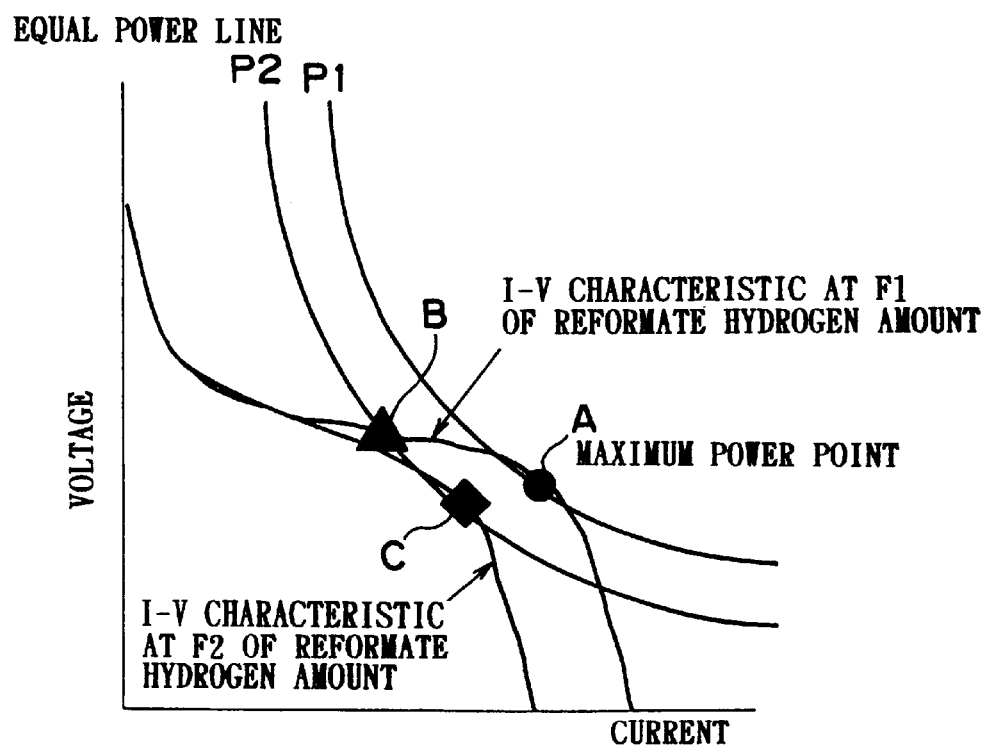
FIG. 9 is a current-voltage characteristic curve at each reformate hydrogen amount.

More specifically, supposing that the reformate hydrogen amount generated by the reformate methanol supplied by the reformate methanol command value M1 to be F1, the maximum electric power that can be picked up at the fuel cell 1 is P1, which is indicated by point A in the current-voltage characteristic curve in FIG. 9. It is indicated by the intersection of the equal power line of P1 and the current-voltage (I-V characteristic) curve at reformate hydrogen amount F1. That is, to obtain the output of P1, the minimum required reformate hydrogen amount is F1, and the minimum required reformate methanol amount is M1. This minimum required amount Ml is obtained in the procedure executed in step 22.

For example, when an output of P2 is required, supposing that the reformate hydrogen amount is set at F1, the current-voltage action point is point B in FIG. 9. By contrast, the optimum action point of output P2 is the intersection C of the equal power line of P2 and I-V characteristic curve at reformate hydrogen amount F2, and therefore the hydrogen gas of the portion proportional to the current difference between point B and point C is unreacted hydrogen gas, resulting in the degraded efficiency. In step 22, since the reformate methanol amount is determined by calculating the maximum power point corresponding to each required power, if the output is P2, the operation runs at the point C, and hence unreacted hydrogen gas amount is suppressed, and an efficient operation is realized.

Figure 10A:
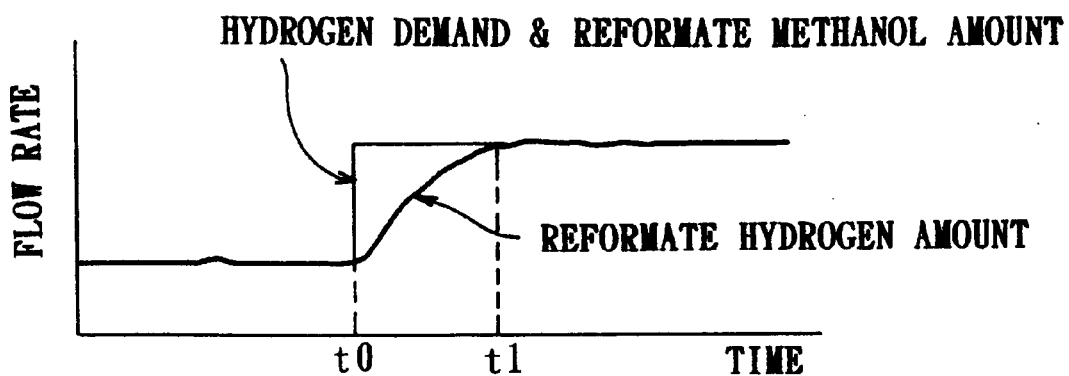
FIG. 10A is a diagram showing changes of reformate hydrogen amount without correction of reformate methanol amount with respect to hydrogen demand amount.
Figure 10B:
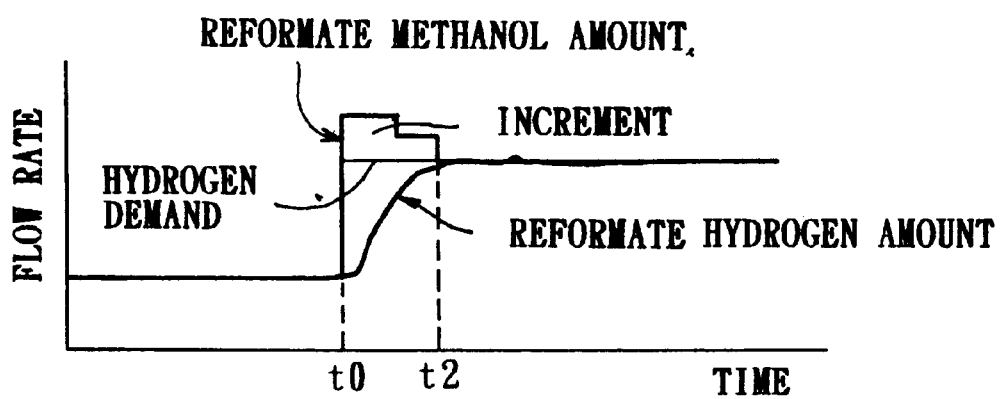
FIG. 10B is a diagram showing changes of reformate hydrogen amount by correction of reformate methanol amount with respect to hydrogen demand amount (demanded amount of hydrogen)

In this control apparatus, as explained in relation to step 23, since the reformate fuel amount is corrected, the response can be enhanced. In FIG. 10A, for the hydrogen demand value, the reformate methanol amount is not corrected, and at the moment t0 when the hydrogen demand is increased, if the reformate methanol amount is increased, it takes a longer time until the reformate hydrogen amount reaches the demand value at time t1 due to reforming reaction delay. By contrast, in FIG. 10B, when the deviation is large between the present reformate hydrogen amount corresponding to the present output current value and the hydrogen demand corresponding to the smoothed output related quantity, by correcting the reformate methanol amount by increasing, the increment rate of the reformate hydrogen amount is large, and the time until the reformate hydrogen amount reaches the hydrogen demand at time t2 becomes shorter. That is, the response of the reformate hydrogen amount is improved.

Then, as explained in step 24, in the control apparatus of the invention, the lower limit of the reformate methanol amount is preset, and when the reformate methanol amount determined on the basis of the output related quantity such as output current becomes less than the lower limit, the amount of reformate methanol determined by this lower limit is supplied, and the reformate hydrogen can be generated while maintaining the operation at the minimum limit of the reformer 6, and therefore supply of electric power to the auxiliary machine such as the compressor for air conditioner can be continued, preventing the system stall.

In this example, methanol is used as reformate fuel, but hydrocarbon other than the methanol may also be used as the fuel in the reformer of the invention. In this invention, moreover, the energy transformer may be the device other than the fuel cell. The output related quantity in the invention is not limited to the output current of the fuel cell, but may be, for example, the opening degree of the accelerator of the vehicle or the sum of capacities of auxiliary machines in operation. The smoothing method of the output related quantity may include, aside from the method shown in the illustrated examples, a method of using a median filter for arranging the values before smoothing in several times of sampling in the past in the order of magnitude, and averaging only the values near the median. When correcting the reformate fuel amount, by using the map as shown in the examples, the operation is easy, but, in the invention, the correction amount of the reformate fuel amount may also be obtained by calculation. In the foregoing examples, the reformate fuel amount is corrected on the basis of the deviation of the present output current value and the smoothed value of the output current, but in the invention, it is not limited to the illustrated examples alone, and it is enough, in short, as far as it is corrected on the basis of the relation between the present output related quantity and the smoothed output related quantity.

What is claimed is:

1. A fuel cell control system comprising a fuel cell that produces electric energy generated by reaction between fuel gas and oxidizing gas and a reformer that generates a fuel gas to be supplied into the fuel cell by reforming reaction of reformate fuel, the system comprising:

a reformate fuel detector configured to detect an amount of reformate fuel to be supplied into the reformer;

an oxidizing gas feed determining device configured to determine a supply amount of the oxidizing gas to the fuel cell on the basis of the amount of reformate fuel to be supplied into the reformer; and an oxidizing gas feed adjuster configured to adjust the supply amount of the oxidizing gas on a basis of a reacting delay of the reforming reaction.

* * * * *

UNITED STATES PATENT AND TRADEMARK OFFICE
CERTIFICATE OF CORRECTION

PATENT NO. : 6,638,652 B1
DATED : October 28, 2003
INVENTOR(S) : Motozono et al.

It is certified that error appears in the above-identified patent and that said Letters Patent is hereby corrected as shown below:

<u>Title page,</u>
Item [75], Inventor, should read
-- [75] Inventors: Yoshikazu Motozono, Nishikamo-gun (JP);
Masashi Yamashita, Nishikamo-gun (JP);
Masaaki Yamaoka, Toyota (JP);
Kiyomi Nagayima, Toyota (JP);
Iwao Maeda, Nagoya (JP) --

Signed and Sealed this

Twenty-fifth Day of May, 2004

JON W. DUDAS
*Acting Director of the United States Patent and Trademark Office*